United States Patent
Kharas

[11] Patent Number: 5,980,844
[45] Date of Patent: Nov. 9, 1999

[54] SO$_2$-TOLERANT SILVER OXIDE CATALYSTS

[75] Inventor: Karl C. C. Kharas, Tulsa, Okla.

[73] Assignee: ASEC Manufacturing, Catoosa, Okla.

[21] Appl. No.: 09/057,807

[22] Filed: Apr. 9, 1998

[51] Int. Cl.$^6$ .................................................. B01D 53/60
[52] U.S. Cl. ................................. 423/213.2; 423/239.1; 502/344; 502/347
[58] Field of Search ........................... 423/212, 213.2, 423/235, 239.1; 502/344, 347, 415

[56] References Cited

U.S. PATENT DOCUMENTS

| | | | |
|---|---|---|---|
| 5,534,237 | 7/1996 | Yoshida et al. | 423/239.1 |
| 5,559,072 | 9/1996 | Itoh et al. | 502/347 |
| 5,589,432 | 12/1996 | Yoshida et al. | 502/325 |
| 5,609,839 | 3/1997 | Itoh et al. | 423/213.2 |
| 5,658,543 | 8/1997 | Yoshida et al. | 423/213.2 |
| 5,710,088 | 1/1998 | Jen et al. | 502/348 |
| 5,714,432 | 2/1998 | Yoshida et al. | 502/415 |
| 5,741,468 | 4/1998 | Saito et al. | 423/239.1 |

OTHER PUBLICATIONS

Kung et al., Catalysts for lean NOx reduction: Structure––property relationship, Appl. Surf. Sci., 261–266, Nov. 1997.

*Primary Examiner*—Thomas Dunn
*Attorney, Agent, or Firm*—Kuffner & Associates

[57] ABSTRACT

An SO$_2$-tolerant catalyst for reducing NO$_x$, in exhaust gas from internal combustion, wherein the exhaust gas contains unburnt hydrocarbons and oxygen comprising silver oxide dispersed on alumina characterized in that such catalyst is white in color.

5 Claims, 3 Drawing Sheets

SO₂-TOLERANT SILVER OXIDE CATALYSTS

FIELD OF THE INVENTION

This invention relates to a silver oxide catalyst that is resistant to deactivation by sulfur dioxide contained in exhaust gases from internal combustion engines. More particularly, this invention relates to a catalyst, comprising alumina and small silver oxide particles highly dispersed thereon, that is resistant to deactivation by $SO_2$ when used to reduce $NO_x$ in automotive exhaust gases, and methods of making same. This invention further relates to a process for reducing the amount of $NO_x$ in exhaust gas from an internal combustion engine using such catalyst.

BACKGROUND OF THE INVENTION

Catalytic converters containing various catalysts have been employed for years by automobile manufacturers to meet the ever-more-stringent regulations on emissions of hydrocarbon, carbon monoxide, and particularly, nitrogen oxides from internal combustion engines. Concurrently with the promulgation of these ever-tightening regulations on emissions, automotive engine manufacturers have worked to improve the fuel economy of such engines. This effort has led to the development of engines that operate with an excess of air beyond that which is required to consume stoichiometrically the fuel admitted to such engines ("lean-burn engines"). The advent of lean-burn engines has, in turn, exacerbated the problem of reducing emission of nitrogen oxides from internal combustion engines.

The selective catalytic reduction of nitrogen oxides by hydrocarbons has attracted much attention recently because it has the potential ability to remove nitrogen oxides from diesel exhaust and other oxygen-rich exhaust gases. A number of researchers have reported that cation-exchanged zeolites and other kinds of catalysts are quite effective in reducing $NO_x$ with hydrocarbons in an oxidizing atmosphere, but are quite susceptible to interference caused by water vapor. Another number of researchers has reported that catalysts comprising noble metal supported on alumina are effective for $NO_x$ reduction even in the presence of water vapor, but only in an extremely limited temperature range. Miyadera (Tatsuo Miyadera, *Applied Catalysis B: Environmental*, volume 2, 199–205, published in 1993) reported that a catalyst comprising silver on alumina has an unusual tolerance for water and is effective for $NO_x$ reduction over a broader temperature range, but did not investigate its performance in the presence of $SO_2$. In this paper, on page 202, Miyadera states "[t]he silver on the $Ag/Al_2O_3$ catalyst is supposed to be in the metal state under the reaction conditions, since silver oxide decomposes to metallic silver and oxygen at temperatures above 300° C. Benton and Elgin [12] reported that water was not very strongly adsorbed on the metallic silver surface. Therefore it seems that water vapor has only a small effect on the reduction of nitric oxide over the $Ag/Al_2O_3$ catalyst above 300° C. Other catalysts such as $Co/Al_2O_3$, $Al_2O_3$, etc. consist of metal oxides and are subject to interference of water vapor because water adsorbs strongly on these oxides."

Contrary to the reports of these researchers and the teachings of the patents discussed below, the present inventor has discovered that catalyst comprising alumina and small silver oxide particles highly dispersed thereon is resistant to deactivation by $SO_2$ and water vapor when used to reduce $NO_x$, in exhaust gases from internal combustion engines.

A number of patents have been granted for compositions that superficially resemble that of the present invention. U.S. Pat. No. 3,857,921 (Tamura et al.) teaches a catalyst comprising iron and silver or their oxides plus a third metal for elimination of $NO_x$ in exhaust gases.

U.S. Pat. No. 5,300,269 (Aichinger et al.) teaches a catalyst comprising metallic silver on alumina for decomposing dinitrogen monoxide.

U.S. Pat. No. 5,208,202 (Muramatsu et al.) teaches a catalyst comprising an alkali metal, a Group IB element and a rare earth element.

U.S. Pat. No. 5,407,651 (Kawai) teaches a catalyst comprising a zeolite having cobalt and silver contained therein to be effective as a three-way catalyst for an oxygen-rich exhaust gas.

More closely on point, U.S. Pat. Nos. 5,534,237 and 5,589,432 (Yoshida et al.) teach that a catalyst comprising alumina impregnated with silver or its oxide is effective for $NO_x$ removal from an oxygen-rich exhaust gas and that pre-treating the catalyst with $SO_2$ further increases the removal ratio of $NO_x$. However, both Yoshida patents are indifferent as to whether the silver exists as a metal or its oxide and teach nothing about the effectiveness of the catalyst when the exhaust gas contains $SO_2$.

Finally, U.S. Pat. No. 5,559,072 (Itoh et al.) teaches that a catalyst comprising activated alumina and silver dispersed thereon is effective for $NO_x$ removal from an oxygen-rich exhaust gas. As in the Yoshida patents, however, the silver may be in either the metal or the oxide form and nothing is taught about the effectiveness of the catalyst when the exhaust gas contains $SO_2$.

SUMMARY OF THE INVENTION

This invention provides for a catalyst suitable for reducing $NO_x$ contained in diesel exhaust, and other oxygen-rich (i.e., containing more than about 2 oxidizing equivalents for each reducing equivalent) exhaust gases containing $SO_2$, comprising alumina and very small, non-agglomerated silver oxide particles dispersed thereon.

The catalyst of this invention is characterized as alumina having non-agglomerated particles less than about 4 nm in size, and probably less than 1 nm, of silver oxide dispersed thereon and is further characterized in that it is white, i.e., devoid of any yellow, gray or other hue. This invention also provides a process for making such catalyst.

Finally, this invention provides processes for reducing $NO_x$ contained in diesel exhaust and other oxygen-rich exhaust gases containing $SO_2$ using the catalyst of the present invention.

DETAILED DESCRIPTION OF THE INVENTION

Figure 1:
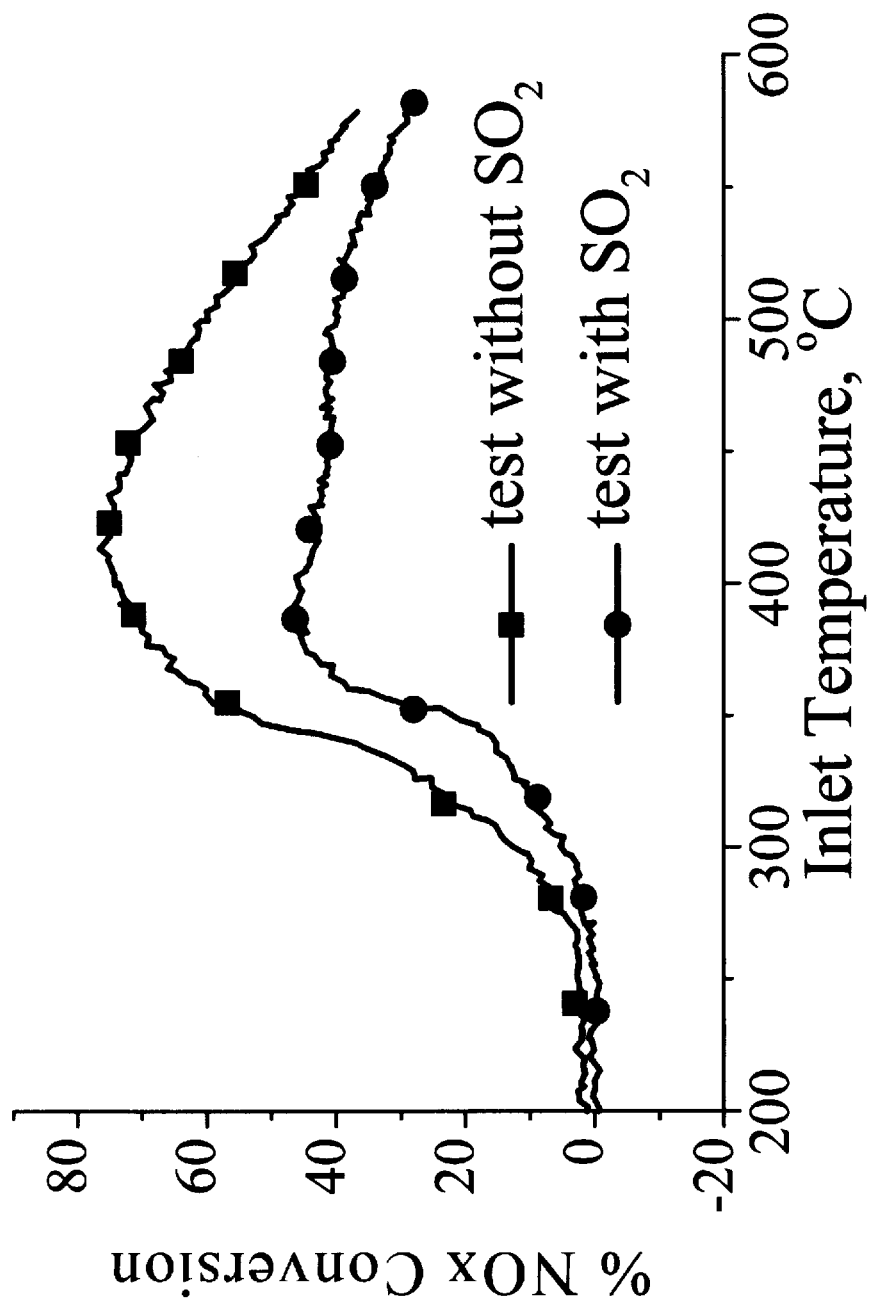
FIG. 1 shows the performance (as $NO_x$ conversion) of a silver oxide/alumina catalyst typical of the prior art when used to treat gas mixtures representative of exhaust gas from a lean-burn engine, with and without $SO_2$ contained therein.

The catalyst of this invention is characterized as alumina having non-agglomerated particles less than about 4 nm in size, and probably less than 1 nm, of silver oxide dispersed thereon and is further characterized in that it is white, i.e., devoid of any yellow, gray or other hue.

Alumina

Any of the high-surface-area phases of alumina, including without limitation γ-alumina, η-alumina, high-surface-area β-alumina and hexa-aluminates, can be used in the invention, with γ-alumina being particularly preferred.

Silver oxide

X-ray diffraction and transmission electron microscopic analyses show the silver oxide particles in a catalyst of the present invention to be smaller than 4 nm in size, and probably smaller than 2 nm. It is hypothesized that the most selective sites for NO reduction occur with Ag(I) species at the limit of atomic dispersion, since even small silver oxide clusters would likely result in non-selective hydrocarbon oxidation by $O_2$ rather than the selective hydrocarbon oxidation using NO as a portion of the oxidant believed to occur with catalyst of the present invention.

Preparation of Catalyst

The alumina for the catalyst may be prepared by calcining boehmite to form a high-surface-area alumina, preferably a high-surface-area γ-alumina. Preferred calcining conditions comprise heating to 150° C. for 2 hours followed by heating to 600° C. for 6 hours. After calcining, the alumina is pulverized and placed in a rotary steam evaporator.

An aqueous silver solution comprising a water soluble silver reagent in deionized water is then sprayed on the alumina while the evaporator is turning. There is wide flexibility in the acceptable concentration of silver in the solution and the amount of solution sprayed on the alumina with the determination of concentration and amount made to be consistent with the desired silver oxide loading on the finished catalyst. Any water soluble silver reagent may be used, with the preferred reagent being silver nitrate. The preferred silver solution contains between about 30 and about 45 grams of silver nitrate per liter of deionized water and the amount of solution should be sufficient to result in a silver oxide loading of between about 0.01 and about 0.03 grams of silver oxide per gram of alumina on the finished catalyst.

After being sprayed with the appropriate amount of silver solution, the alumina is steam-evaporated to dryness and calcined, preferably for 6 hours at 600° C. in an air atmosphere. Following calcining, the material is then milled, dried and calcined at 150° C. for 2 hours and then at 600° C. for 6 hours. The resulting powder is then inspected to determine if it is white in color, indicating that the silver oxide particles are small and highly dispersed.

Catalyst Performance

Catalyst of the present invention has been found to be very effective in converting $NO_x$ in exhaust gases containing unburnt hydrocarbons and excess oxygen, with $NO_x$ conversions of between 94% and 98% at 400° C. being observed. The presence of up to 20 ppm of $SO_2$ in the exhaust gas being treated has no measurable effect on $NO_x$ conversion.

In addition, the silver oxide particles have been found to be very stable catalytically. Exposure to a reducing atmosphere converts the silver oxide particles to silver. However, subsequent exposure to an oxidizing atmosphere returns the catalyst to the white color and the catalyst has lost none of its activity in being able to effectively reduce $NO_x$. This is indicative of the very small silver oxide particles highly dispersed on alumina of this invention.

EXAMPLE 1

This example describes the preparation of a silver oxide on alumina catalyst typical of the prior art.

A quantity of γ-alumina was made by calcining Vista 23N4-80 boehmite (lot no. 6A-T04514J) at 150° C. for 2 hours and then at 600° C. for 6 hours. 1300 grams of this material were placed in a rotary steam evaporator. Separately, 41.78 grams of $AgNO_3$ were dissolved in 1200 grams of deionized water and then sprayed on the γ-alumina. The alumina was dried overnight in the steam evaporator, calcined in air at 150° C. for 2 hours and then at 600° C. for 6 hours. About 150 grams of the resulting material were milled in a high-speed mill for 5 minutes. The resultant slurry was then calcined in air at 150° C. for 2 hours and then at 600° C. for 6 hours and sized to 20–40 mesh. The resulting catalyst was examined and found to be slightly gray in color, indicating that some agglomeration of silver and/or silver oxide has occurred.

EXAMPLE 2

This example describes the preparation of a catalyst of the present invention.

1500 grams of the same γ-alumina as prepared in Example 1 material were placed in a rotary steam evaporator. Then 48.21 grams of $AgNO_3$ were dissolved in 1000 grams of deionized water and sprayed on the γ-alumina. The alumina was dried overnight in the steam evaporator, calcined in air at 150° C. for 2 hours and then at 600° C. for 6 hours. About 150 grams of the resulting material were milled in a high-speed mill for 5 minutes. The resultant slurry was calcined in air at 150° C. for 2 hours and then at 600° C. for 6 hours and sized to 20–40 mesh. The resulting catalyst was examined and found to be snow white in color.

EXAMPLE 3

The performance of the catalysts prepared in Examples 1 and 2 are compared in this example.

Figure 2:
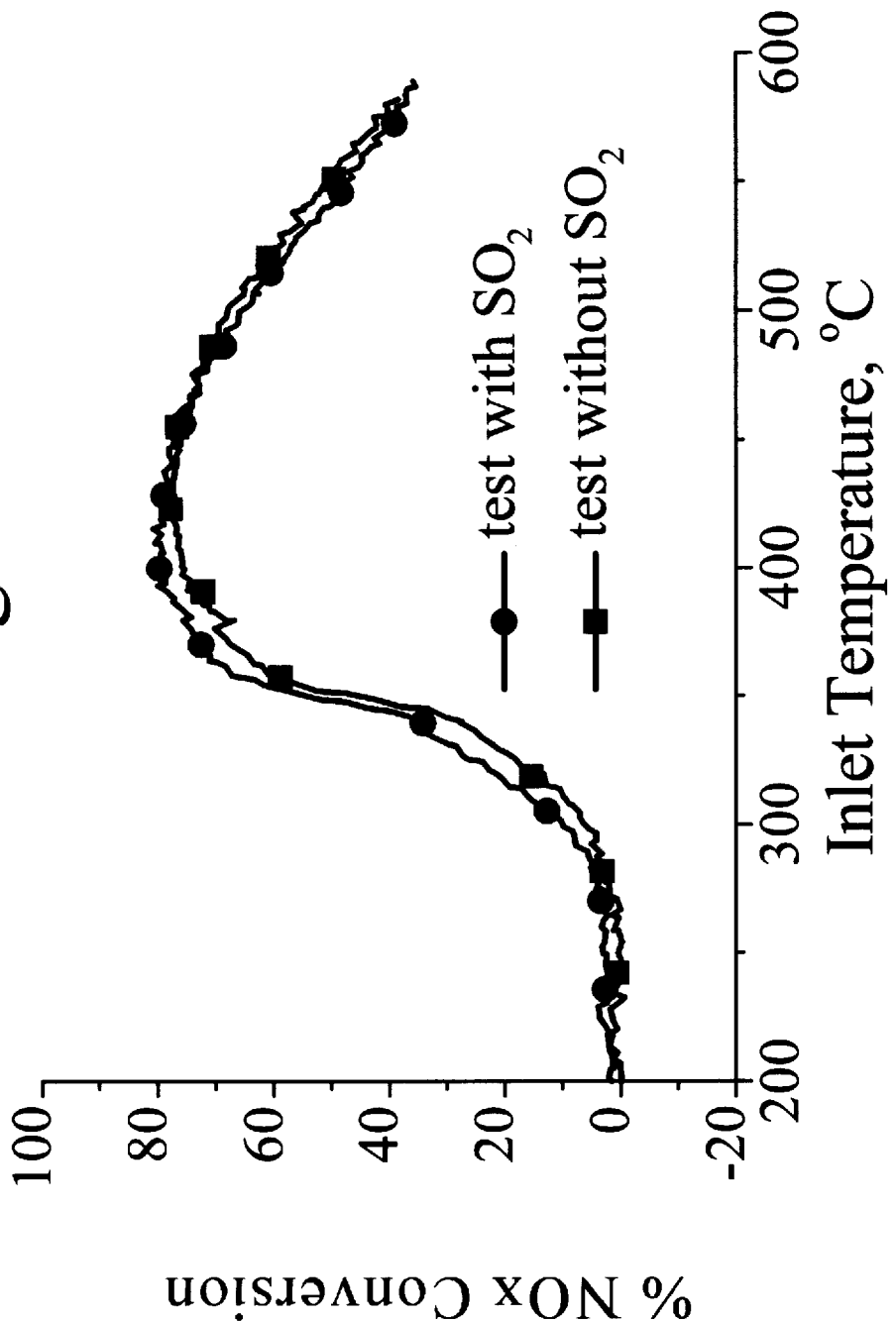
FIG. 2 shows the performance (as $NO_x$ conversion) of a silver oxide/alumina catalyst of the present invention when used to treat the same gas mixtures.

A 1 gram sample of each catalyst was loaded into a quartz reactor and a gas consisting of 1000 ppm $NO_x$, 300 ppm CO, 8% water, 8% $CO_2$, 500 ppm octane, 12% $O_2$ and the balance $N_2$ was passed over the catalyst. For the following tests for $SO_2$ tolerance, the gas also contained 20 ppm of $SO_2$. The temperature of the gas entering the reactor was increased from 50° C. to 550° C. at a rate of 7° C. per minute, held constant for 1 hour, and then rapidly cooled by cutting power to the gas heater and blowing room-temperature air onto the reactor exterior surfaces. After reducing the catalyst temperature to about 50° C., the gas inlet temperature was again increased from 50° C. to 550° C. at a rate of 7° C. per minute, with $NO_x$ conversion measured at regular intervals during this second temperature ramp. Each catalyst was evaluated twice, once with and once without $SO_2$ in the entering gas. The results of these evaluations are shown in FIG. 1 for the catalyst of Example 1 and in FIG. 2 for the catalyst of Example 2.

The figures show that the catalyst of Example 1 (typical of the prior art) performs about the same as the catalyst of Example 2 (present invention) when no $SO_2$ is present in the entering gas, but gives dramatically inferior performance when $SO_2$ is present.

EXAMPLE 4

This example describes the preparation of catalyst of the present invention used in Examples 5 and 6 below to demonstrate that the silver exists as highly dispersed, oxidized species distributed on the surface of the alumina.

Condea DISPAL 23N4-80 boehmite was calcined for 2 hours at 150° C. and then for 6 hours at 600° C. to convert the boehmite to a high-surface-area γ-alumina. The resulting γ-alumina was pulverized with mortar and pestle and 1 kilogram of the material was placed into a glass rotary steam evaporator. 32.1 grams of silver nitrate were separately dissolved in 310 grams of deionized water. With steam injection into the evaporator and with the evaporator turning, this silver solution was sprayed onto the γ-alumina. The resultant material was steam-evaporated to dryness and then calcined for 6 hours at 600° C. in air. This material was then milled in a high-speed mill. The resulting suspension was dried and calcined for 2 hours at 150° C. and then for 6 hours at 600° C. The resulting catalyst was snow white in color. X-ray diffraction analysis does not reveal any silver-containing phases.

EXAMPLE 5

Several 1 gram samples of the catalyst prepared in Example 4 were contacted with a gas consisting of 1000 vppm NO, 500 vppm octane, 300 vppm CO, 20 vppm $SO_2$, 8 vol. % $CO_2$, 8 vol. % $H_2O$, 12 vol. % $O_2$ and the balance $N_2$ flowing at a rate of 5.0 liters/minute and an estimated space velocity of 100,000/hour. High levels of $NO_x$ reduction were attained in each test and maximum $NO_x$ reduction was between 94% and 98% at about 400° C. The catalyst samples remained snow white in color during and after the tests.

EXAMPLE 6

A portion of the catalyst prepared in Example 4 was treated with a gas stream consisting of 4 vol. % $H_2$ and the balance $N_2$ for 1 hour at 200° C. and then at 600° C. for 6 hours to make a reduced catalyst. The reduced Ag/γ-alumina catalyst was deep burgundy in color and X-ray diffraction analysis reveals silver metal crystallites 7 to 10 nm in size. A portion of this reduced catalyst was then oxidized in air for 1 hour at 200° C. and then at 600° C. for 6 hours. The re-oxidized catalyst was snow white and X-ray diffraction analysis does not reveal any silver-containing phases, indicating the absence of silver-containing phases greater than 4 nm in size. The fact that the original catalyst (prepared in Example 4) and the re-oxidized catalyst of this example are snow white is believed to result from the silver occurring as highly dispersed, oxidized species distributed throughout the surface of the alumina. Silver metal and known bulk oxides of silver are all known to be dark materials. The fact that both the original and the re-oxidized catalysts are snow white indicates that neither silver metal nor small crystallites of a bulk oxide of silver occur in these oxidized catalysts.

EXAMPLE 7

This example illustrates the $NO_x$ reduction capability of the reduced and re-oxidized catalysts prepared in Example 6.

Figure 3:
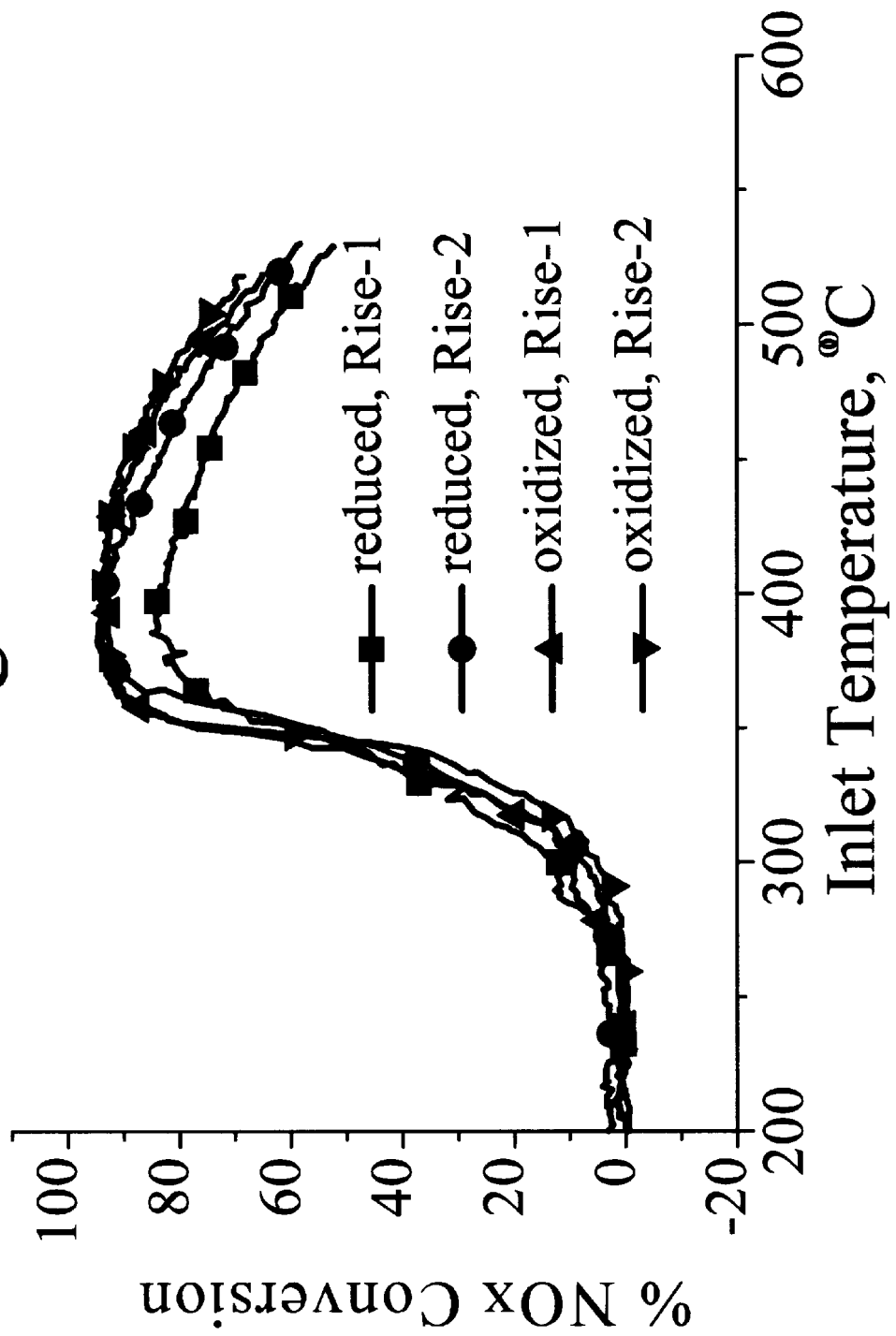
FIG. 3 shows the performance (as $NO_x$ conversion) of catalysts of the present invention that have been reduced and re-oxidized when used to treat a gas mixture, containing $SO_2$, representative of exhaust gas from a lean-burn engine.

One gram samples of each of the reduced and re-oxidized catalysts prepared in Example 6 were contacted with the same gas mixture and under the same flow conditions as in Example 5. The temperature of the gas was increased from about 60° C. to about 550° C. at a rate of 7° C. per minute (this temperature increase program is hereafter referred to as Rise 1). The gas temperature was held at 550° C. for one hour and then rapidly reduced to about 60° C. The temperature of the gas was again increased to about 550° C. at a rate of 7° C. per minute (this second temperature increase program is hereafter referred to as Rise 2). $NO_x$ conversion versus temperature data for Rise 1 and Rise 2 for each of the samples is shown in FIG. 3. The data show that the reduced catalyst's performance is inferior during Rise 1 to its performance during Rise 2 and to the performance of the re-oxidized catalyst during both Rise 1 and Rise 2. This inferior performance is due to the fact that, during Rise 1 on the reduced catalyst, at least some of the dispersed silver remains in the reduced state. After the one-hour holding period at 550° C., however, the dispersed, reduced silver species were re-oxidized. Similar treatment in air yields similar re-oxidation. The data from Rise 2 on the reduced catalyst and from Rises 1 and 2 on the re-oxidized catalyst show substantially the same performance as that shown by the original catalyst samples in Example 5, thereby providing strong evidence that active silver is oxidized silver. This is somewhat surprising since Miyadera and others have reported that oxides of silver decompose upon heating to moderate temperatures to yield metallic silver and molecular oxygen.

I claim:

1. An $SO_2$-tolerant catalyst for reduction of $NO_x$ contained in the exhaust gas from an internal combustion engine, wherein said exhaust gas contains unburnt hydrocarbons and oxygen, comprising alumina and a catalytically effective amount of silver oxide particles dispersed thereon, said particles being less than about 4 nm in size, made by a process comprising:

a) pulverizing alumina;

b) dispersing a sufficient amount of a solution of silver reagent onto the pulverized alumina to produce the catalytically effective amount of silver oxide particles;

c) drying and calcining the product of step (b); and, d) selecting catalyst that is white in color.

2. The catalyst of claim 1 wherein the alumina is γ-alumina and the amount of silver oxide is between about 1 wt. % and about 3 wt. % of the alumina.

3. The catalyst of claim 1 wherein the silver reagent is silver nitrate.

4. A process for reducing $NO_x$ contained in the exhaust gas from a lean-burn internal combustion engine, wherein said exhaust gas contains unburnt hydrocarbons and oxygen comprising contacting the exhaust gas with the catalyst of claim 1.

5. The process of claim 4 wherein the exhaust gas also contains $SO_2$.

* * * * *